United States Patent
Chung

[19]

[11] Patent Number: 6,023,449
[45] Date of Patent: Feb. 8, 2000

[54] OPTICAL PICKUP FOR ADJUSTING FOCUS ERROR SIGNAL OFFSET AND HAVING WIDELY SEPARATED PHOTODETECTOR ELEMENTS

[75] Inventor: Chong-sam Chung, Seongnam, Rep. of Korea

[73] Assignee: Samsung Electronics Co., Ltd., Suwon, Rep. of Korea

[21] Appl. No.: 09/131,174

[22] Filed: Aug. 10, 1998

[30] Foreign Application Priority Data

Mar. 3, 1998 [KR] Rep. of Korea ......................... 98-6954

[51] Int. Cl.⁷ ...................................... G11B 7/00
[52] U.S. Cl. ......................... 369/112; 369/44.42; 369/94; 369/120
[58] Field of Search ................................. 369/112, 44.23, 369/44.37, 44.41, 120, 94, 44.42, 44.35, 44.11

[56] References Cited

U.S. PATENT DOCUMENTS

| | | | |
|---|---|---|---|
| 4,517,666 | 5/1985 | Ando | 369/44.24 |
| 4,926,306 | 5/1990 | Ueda et al. | 363/58 |
| 5,015,835 | 5/1991 | Ohuchida et al. | 250/201.5 |
| 5,144,606 | 9/1992 | Kadowaki | 369/44.41 |
| 5,159,589 | 10/1992 | Ohsato | 369/44.35 |
| 5,537,384 | 7/1996 | Lee et al. | 369/118 |
| 5,802,037 | 9/1998 | Lee et al. | 369/120 |

*Primary Examiner*—Tan Dinh
*Assistant Examiner*—Kim-Kwok Chu
*Attorney, Agent, or Firm*—Staas & Halsey

[57] ABSTRACT

An optical pickup which include a light source; an optical path changing portion to change a path of light emitted from the light source; an objective lens to converge the light from the optical path changing portion to form a light spot on a recording surface of a disk; and a photodetector having at least two light-receiving regions, preferably four light-receiving regions in a 2×2 matrix, which separately perform photo-electric conversion, for receiving the light which has passed through the optical path changing portion and the objective lens and been reflected from the disk. The light-receiving regions are separated by a predetermined distance, such that a center region of the light is not received by the light-receiving regions.

20 Claims, 6 Drawing Sheets

OPTICAL PICKUP FOR ADJUSTING FOCUS ERROR SIGNAL OFFSET AND HAVING WIDELY SEPARATED PHOTODETECTOR ELEMENTS

CROSS-REFERENCE TO RELATED APPLICATIONS

This application claims the benefit of Korean Application No. 98-6954, filed Mar. 3, 1998, in the Korean Patent Office, the disclosure of which is incorporated herein by reference.

BACKGROUND OF THE INVENTION

1. Field of the Invention

The present invention relates to a compatible optical pickup which is compatible with disks having different thicknesses, and more particularly, to an optical pickup enabling adjustment of a focus error signal offset, and reducing the focus error signal offset during recording/reproducing disks having different thicknesses.

2. Description of the Related Art

An optical pickup device is used for recording and reproducing an image, sound or data on and from an optical disk at a high density. The optical disk includes a substrate made of plastic or glass having a predetermined thickness, through which incident light passes, and an information recording layer formed behind the substrate. The size of the optical disk is standardized, and efforts are now concentrated on increasing the information recording density on the information recording layer, to record more information on the optical disk having a predetermined size.

A digital versatile disk (DVD) and high definition (HD)-DVD, released recently, are high-capacity optical disks capable of recording massive amounts of information. The thickness of the DVD is standardized to be different from that of a compact disk (CD), taking account of an allowance error in mechanical disk slant and numerical apertures of objective lenses.

That is, an optical pickup for recording/reproducing information on/from a CD has an objective lens having a numerical aperture of 0.45, while an optical pickup for recording/reproducing information on/from a DVD has an objective lens having a numerical aperture of 0.6, to increase recording/reproducing density. The thickness of the CD is 1.2 mm while the thickness of the DVD is 0.6 mm due to the allowance error of disk slant, caused by using the objective lens having a larger numerical aperture. It is likely that the thickness of the HD-DVD will be standardized to 0.6 mm.

Also, wavelengths of the light source for reproduction are different in the DVD and CD. That is, while the wavelength of the light source for reproduction of a CD is approximately 780 nm, the wavelength of the light source for reproduction of a DVD is approximately 650 nm. Also, for reproduction in the HD-DVD, a light source emitting light having a short wavelength of approximately 420 nm will be required.

Because of the difference of thickness between the CD and DVD, spherical aberration occurs when information is recorded/reproduced on/from a CD using an optical pickup for the DVD, so that enough light intensity for recording information cannot be obtained or a reproduced signal deteriorates.

Figure 1:
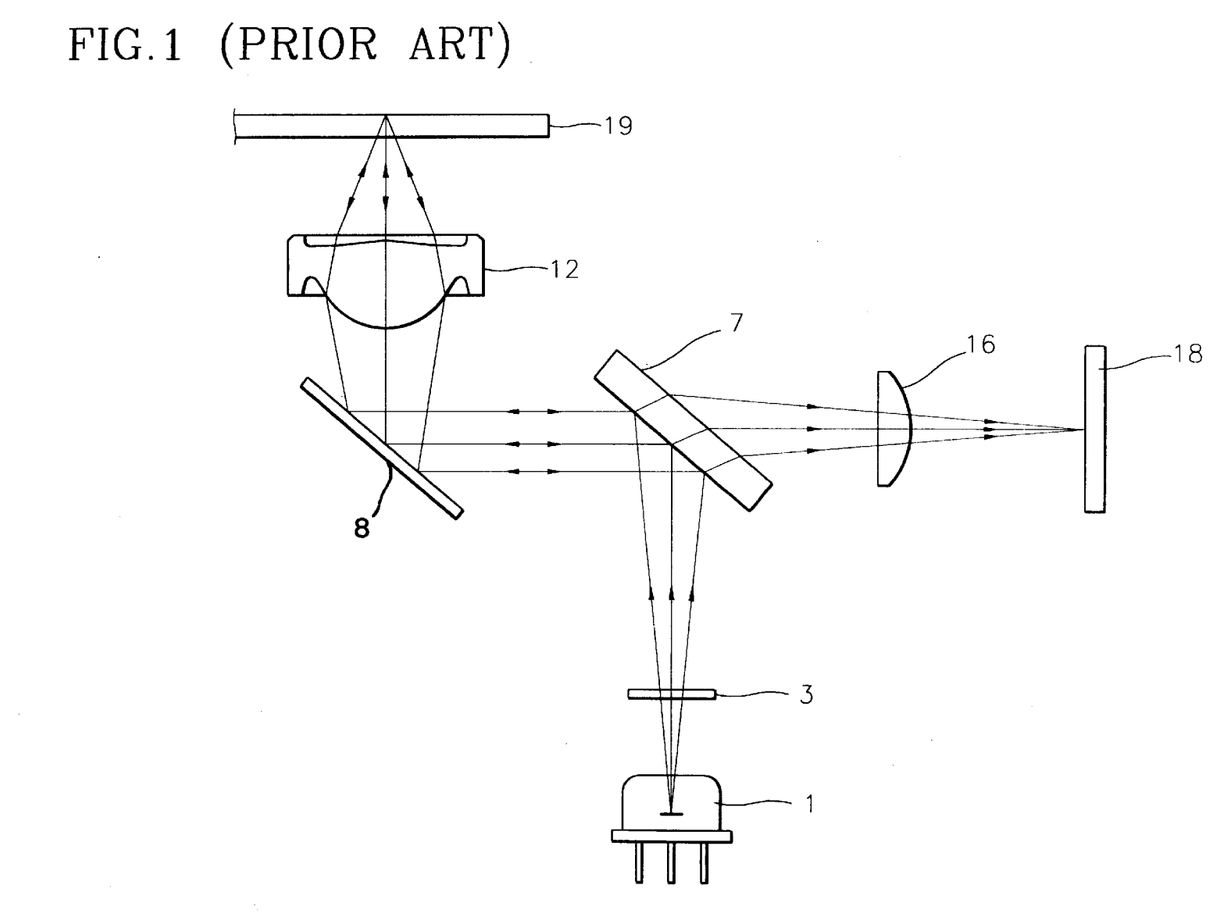
FIG. 1 shows an optical arrangement of a conventional optical pickup.

Referring to FIG. 1, which shows the optical arrangement of a general optical pickup for DVD, the optical pickup includes a light source 1, a light beam splitter 7 for changing the path of incident light, a mirror 8 to reflect the incident light from the beam splitter, an objective lens 12 for converging incident light reflected from the mirror 8 to form a light spot on the recording surface of a disk 19, and a photodetector 18 for detecting an error signal and a radio frequency signal. Here, the light source 1 emits a light having a wavelength of approximately 650 nm, and the numerical aperture of the objective lens 12 is 0.6.

The light emitted from the light source 1 passes through the beam splitter 7 and is reflected by the mirror 8 to be condensed by the objective lens 12 and form a light spot on the recording surface of the disk 19.

Figure 2:
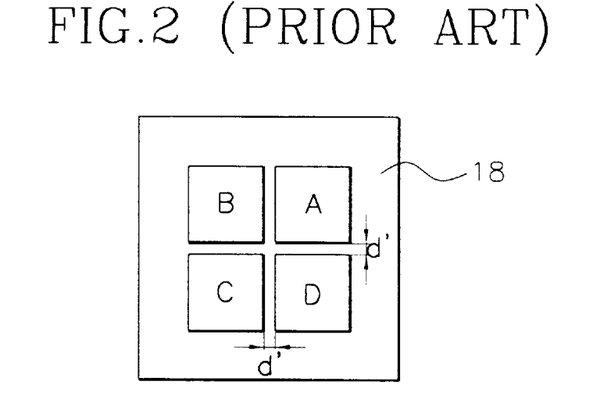
FIG. 2 shows a photodetector of FIG. 1.

Then, light reflected from the disk 19 passes through the objective lens 12, is reflected by the mirror 8, passes through the beam splitter 7 to be incident on the photodetector 18. As shown in FIG. 2, the photodetector 18 includes four light-receiving regions A, B, C and D which separately undergo photo-electric conversion to allow the detection of a focus error signal (FES) by an astigmatism method. Here, a distance d' between the light-receiving regions is less than approximately 10 $\mu$m. In FIG. 1, reference numeral 3 represents a grating for diverging the incident light by diffraction to detect a tracking error signal by a three-beam method, and reference numeral 16 represents a condensing lens for condensing the incident light to form a light spot on the photodetector 18.

Figure 3A:
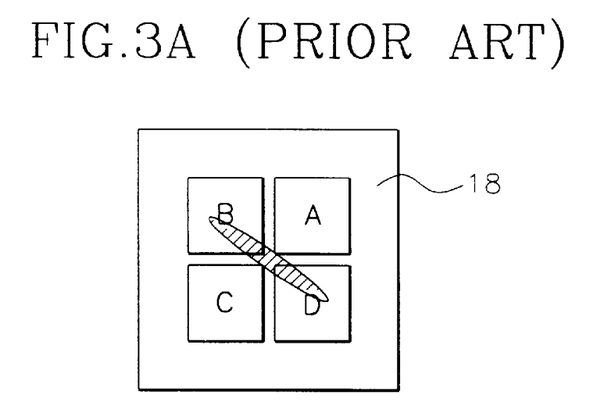
FIGS. 3A through 3E show a light spot received by a photodetector, according to the distance between a DVD and an objective lens when recording/reproducing information on/from the DVD using the optical pickup shown in FIG. 1.
Figure 3B:
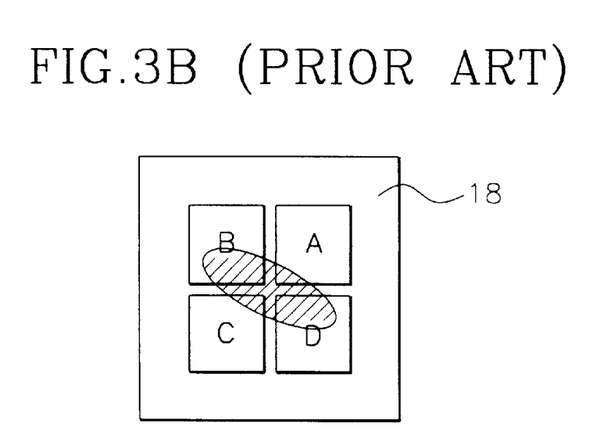
Figure 3C:
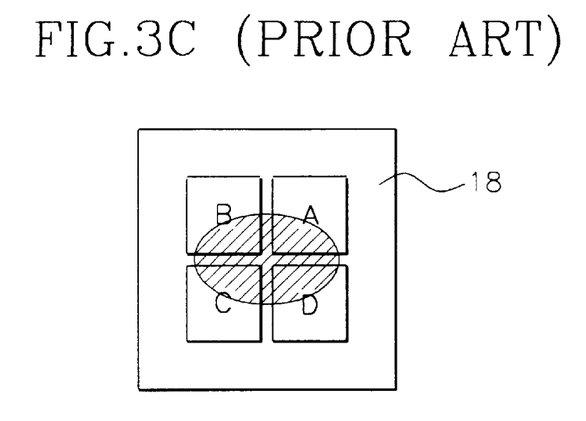
Figure 3D:
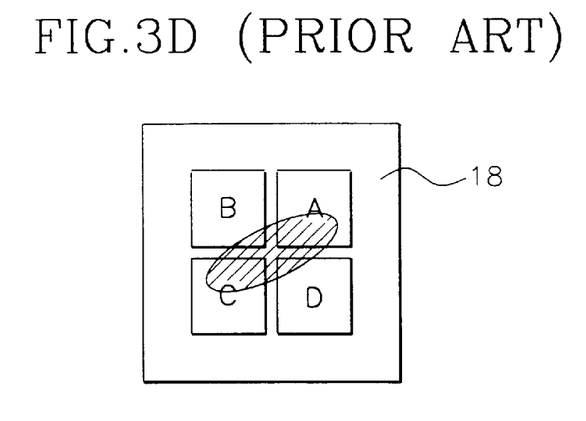
Figure 3E:
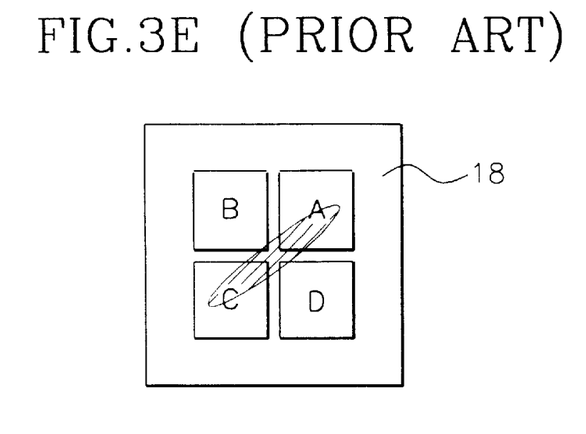

In operation, the beam splitter 7 is astigmatic, which affects the light reflected from the disk 19 as it passes through the beam splitter 7. Thus, a light spot formed on the photodetector 18 during the recording/reproduction of a DVD changes according to the distance between the objective lens 12 and the disk 19 as shown in FIGS. 3A through 3E. Here, FIGS. 3A and 3B show a light spot received by the photodetector 18 in the case where the distance between the objective lens 12 and the disk 19 is longer than the focal distance of the objective lens 12. FIG. 3C shows a light spot received by the photodetector 18 in the case where the distance between the objective lens 12 and the disk 19 is equal to the focal distance, that is, under an on-focus state, and FIGS. 3D and 3E show a light spot received by the photodetector 18 in the case where the distance between the objective lens 12 and the disk 19 is shorter than the focal distance.

In the optical pickup, the FES is obtained from the difference between the sums of signals of diagonally opposite light-receiving regions. That is, the FES is obtained by the difference between the sum of signals of the light-receiving regions A and C, and the sum of signals of the light-receiving regions B and D. In an on-focus state as shown in FIG. 3C, the value of a reproduced signal becomes the maximum, and the FES is approximately 0.

When recording/reproducing information on/from a CD using an optical pickup device for DVD, the light spot formed on the photodetector 18 is distorted due to the spherical aberration caused by the difference between the thickness of the DVD and CD. In this case, the FES is also distorted, so that focusing is difficult. Accordingly, it is difficult to record/reproduce information on/from a CD.

Figure 4:
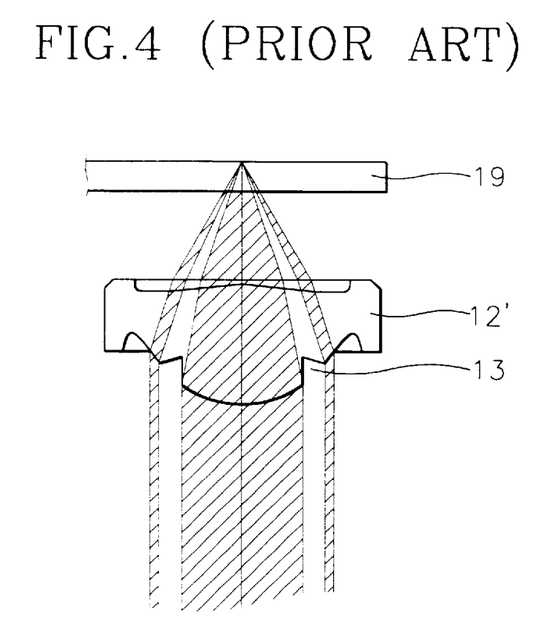
FIG. 4 shows another example of the objective lens shown in FIG. 1.
Figure 5:
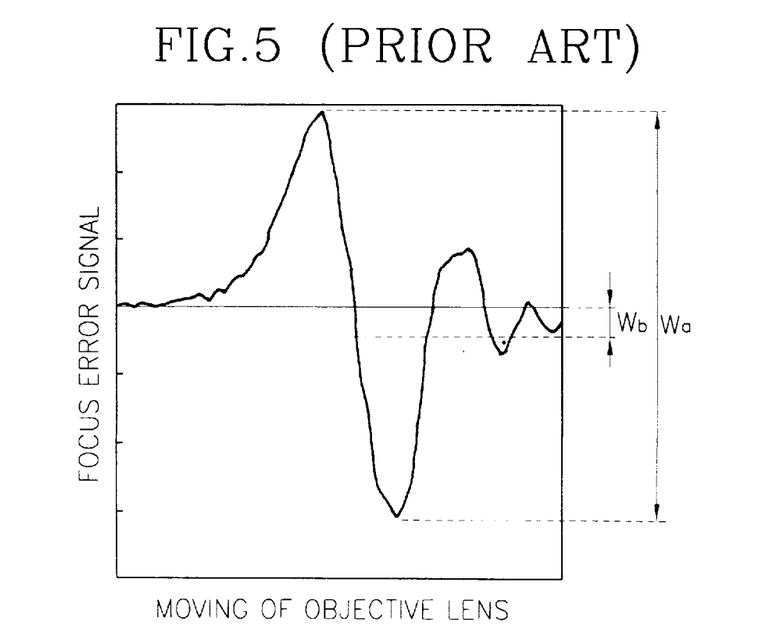
FIG. 5 is a graph showing a focus error signal detected by the photodetector of FIG. 1 when adopting the objective lens shown in FIG. 4.

To overcome the above problems, an objective lens 12' having an annular light control pattern 13 is adopted as shown in FIG. 4, so that the FES as shown in FIG. 5 is obtained when recording/reproducing information on/from the CD. In FIG. 5, the horizontal axis represents the distance between the objective lens 12' and the disk 19, that is, the moving amount of the objective lens 12', and the vertical axis represents an FES.

The distance between the disk 19 and the objective lens 12' is controlled to achieve focus according to the FES, thereby recording/reproducing information on/from the CD.

However, even though the distance between the CD and the objective lens 12' is correct for focus, the FES is not equal to 0 but has a predetermined FES offset value due to the effect of the spherical aberration caused by the difference in thickness between the CD and the DVD. As shown in FIG. 5, the focus error signal offset is expressed as a percentage of the focus error signal value Wb in an on-focus state where the value of the reproduced signal is the maximum, with respect to the maximum amplitude Wa of the focus error signal. If the focus error signal offset is over 10%, compatibility with the CD is impossible. In particular, when reproducing information from the CD using an optical pickup for HD-DVD recording/reproduction, adopting a light source emitting light of approximately 420 nm and an objective lens having the numerical aperture of 0.6, the focus error signal offset becomes 30% due to the effect of the spherical aberration, so that it is impossible to reproduce information from the CD.

SUMMARY OF THE INVENTION

To solve the above problems, it is an object of the present invention to provide an optical pickup for adjusting a focus error signal offset, having a photodetector of a structure to reduce a focus error signal offset, so as to be compatible with disks of different thicknesses.

Additional objects and advantages of the invention will be set forth in part in the description which follows and, in part, will be obvious from the description, or may be learned by practice of the invention.

To achieve the above and other objects of the present invention, there is provided an optical pickup including a light source; optical path changing means for changing the path of light emitted from the light source; an objective lens to converge the light from the optical path changing means to form a light spot on a recording surface of a disk; and a photodetector having at least two light-receiving regions, which separately perform photo-electric conversion, and receive the light which has passed through the optical path changing means and the objective lens and been reflected from the disk, wherein the light-receiving regions are separated by a predetermined distance, such that a portion of the light which is exposed to a great effect of spherical aberration is not received.

The at least two light-receiving regions preferably are four light-receiving regions arranged in a 2×2 matrix. Further, preferably, the distance between the light-receiving regions is in the approximate range of 23 to 35 $\mu$m.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 6:
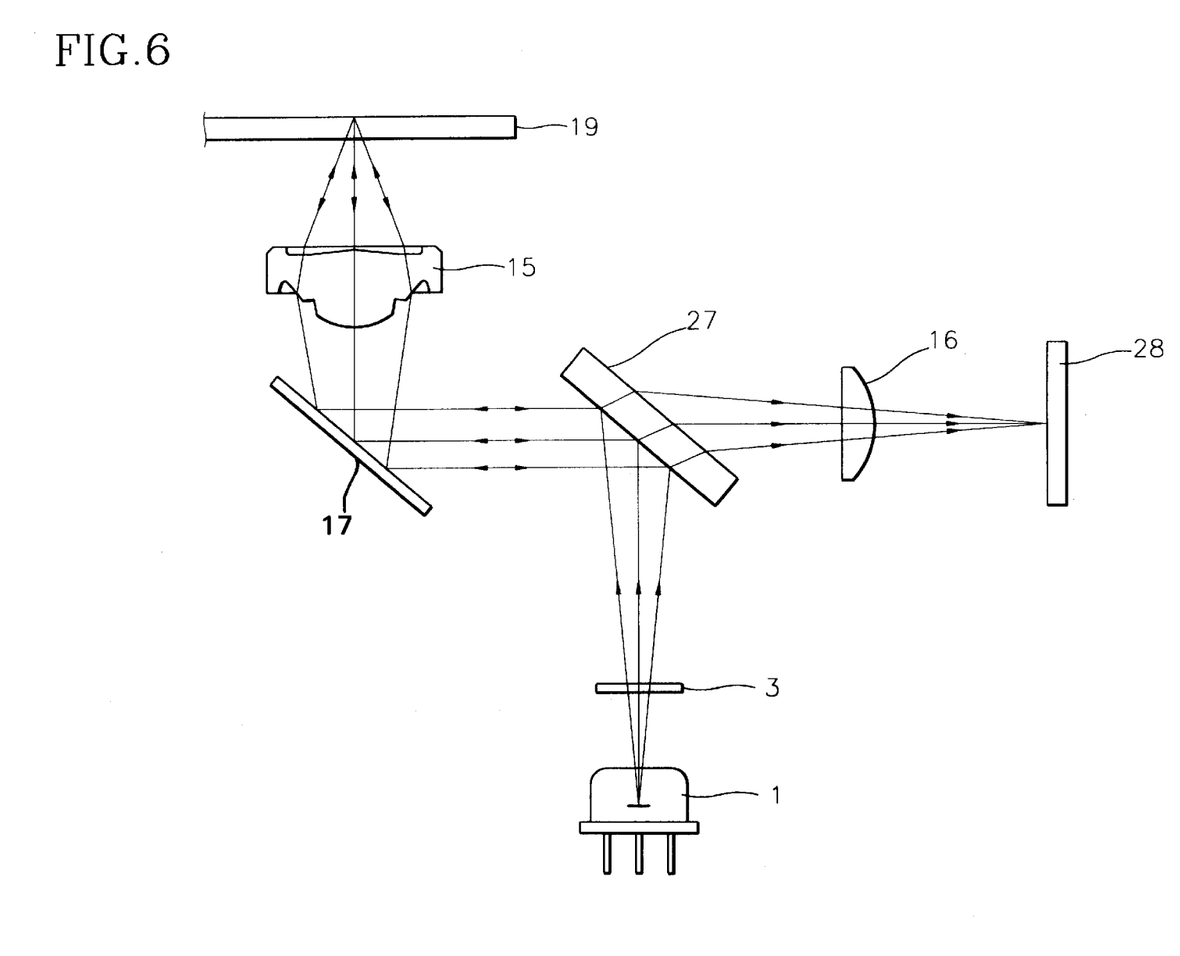
FIG. 6 is a diagram showing the optical arrangement of an optical pickup for adjusting a focus error signal offset, according to a preferred embodiment of the present invention.

Referring to FIG. 6, an optical pickup for adjusting a focus error signal offset, according to the present invention, includes a light source 1, optical path changing means 27 for changing the path of incident light, a mirror 17 to reflect the incident light from the optical path changing means 27, an objective lens 15 for condensing incident light reflected from the mirror 17, and a photodetector 28 having at least two light-receiving regions A, B (not shown in this FIG.) for receiving light via the optical path changing means 27 after being reflected from the disk 19. The optical pickup having the above structure is suitable for DVD reproduction.

The objective lens 15 can be the objective lens 12' having the light control pattern 13 illustrated with reference to FIG. 4.

The optical path changing means 27 may be a flat type beam splitter for passing the light reflected from the disk 19 and introducing astigmatism. Alternatively, the optical path changing means 27 may be various other optical devices for diverging the path of incident light. Here, an astigmatic lens (not shown) according to the distance between the objective lens 15 and the disk 19 may be included in the optical path between the optical path changing means 27 and the photodetector 28.

Figure 7:
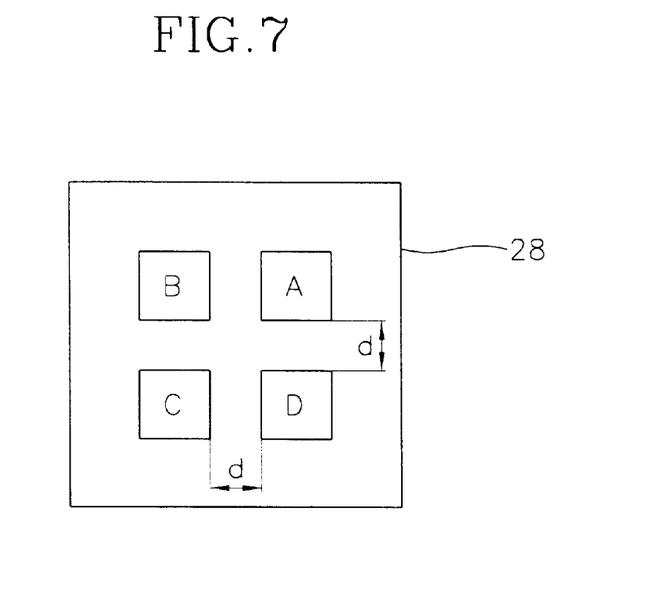
FIG. 7 shows the photodetector shown in FIG. 6.

As shown in FIG. 7, the photodetector 28 includes light-receiving regions A, B, C and D in a 2×2 matrix, which separately perform photo-electric conversion to detect the FES by the astigmatism method. According to the characteristic of the present invention, the distance "d" between the light-receiving regions A, B, C and D becomes several tens of $\mu$m, which is greater than the conventional distance of less than 10 $\mu$m.

With the above configuration, when recording/reproducing information on/from the disk 19 when the disk 19 is a thick disk, e.g., a CD, the light at the center of the light spot incident onto the photodetector 28, which is less affected by the astigmatism, due to the large spherical aberration, is not received by the photodetector 28. Thus, the effect of the spherical aberration, caused when using the disk 19 having the different thickness, is minimized, so that the FES offset of the FES obtained from the difference between the sums of the signals of the diagonally opposite light-receiving regions is decreased.

Figure 8:
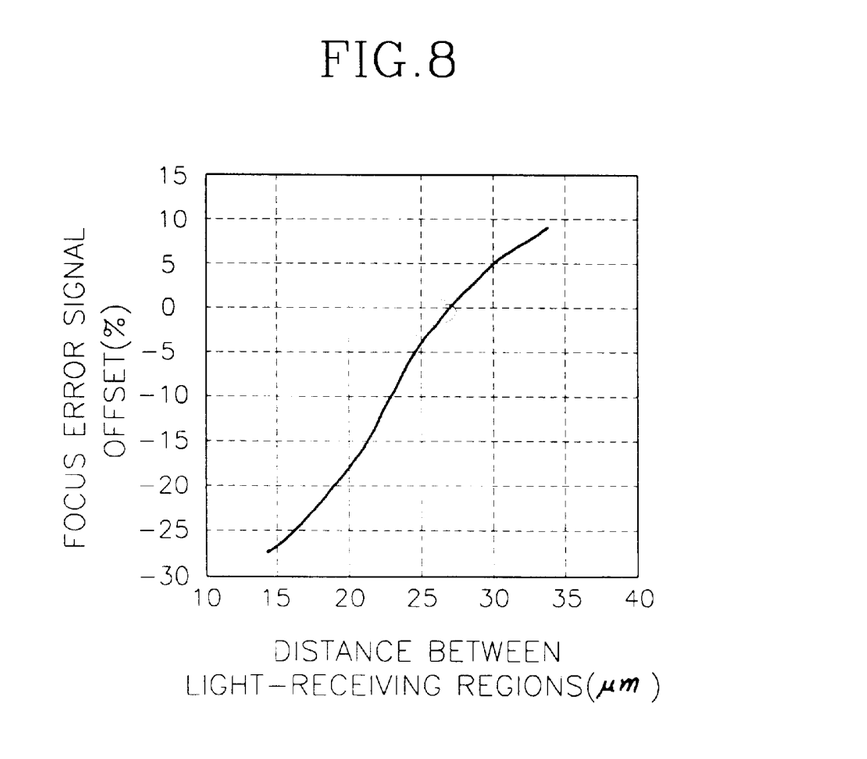
FIG. 8 is a graph showing a focus error signal offset according to the distance between the light-receiving regions of the photodetector shown in FIG. 6.

When reproducing information from a CD using an optical pickup for DVD according to the present invention, the FES offset according to the change of the distance between the light-receiving regions A, B, C and D of the photodetector 28 is shown in FIG. 8.

In FIG. 8, the wavelength of the light source 1 is 420 nm and the numerical aperture of the objective lens 15 is 0.6.

As shown in FIG. 8, when the distance between the light-receiving regions is approximately 25~30 μm, the FES offset is reduced to ±5%. Also, when the distance between the light-receiving regions is approximately 23~35 μm, the FES offset is still within ±10%, which ensures compatibility with CDs.

According to the present invention, the distance "d" between the light-receiving regions A, B, C and D of the photodetector 28 can be controlled to a suitable value within the range in which the photodetector 28 does not receive the part of the light spot which is exposed to a great effect of the spherical aberration.

The optical pickup according to the embodiment of the present invention includes a photodetector which has four light-receiving regions in a 2×2 matrix, and detects a focus-error signal by an astigmatism method. However, the photodetector may instead include at least two light-receiving regions arranged to reduce the focus error signal offset, and detect the focus error signal by another method, e.g., a beam size method.

As described above, the optical pickup according to the embodiment of the present invention includes a photodetector in which the distance between the light-receiving regions is property adjusted to minimize the effect of the spherical aberration caused by the difference in thickness when information is recorded/reproduced on/from a disk having a different thickness, so that the FES offset is reduced. As a result, the optical pickup is compatible with disks having different thicknesses.

What is claimed is:

1. An optical pickup to access a disk having a recording surface, comprising:

a light source to generate light;

optical path changing means for changing the path of the light emitted from the light source;

an objective lens to converge the light from the optical path changing means to form a light spot on the recording surface of the disk; and a photodetector having at least two light-receiving regions, wherein the light-receiving regions separately perform photo-electric conversion and receive the light which has passed through the optical path changing means and the objective lens and been reflected from the disk;

wherein the light-receiving regions are separated from adjacent ones of the light-receiving regions by a predetermined distance so that a focus error signal offset due to spherical aberration caused by the optical pickup accessing the disk when the disk has a first thickness and when the disk has a second thickness greater than the first thickness is not greater than 10%, such that a center region of the light incident on the photodetector between the light-receiving regions is not received by the light-receiving regions.

2. The optical pickup of claim 1, wherein the at least two light-receiving regions includes four light-receiving regions in a 2×2 matrix.

3. An optical pickup to access a disk having a recording surface, comprising:

a light source to generate light;

optical path changing means for changing the path of the light emitted from the light source;

an objective lens to converge the light from the optical path changing means to form a light spot on the recording surface of the disk; and a photodetector having at least two light-receiving regions, wherein the light-receiving regions separately perform photo-electric conversion and receive the light which has passed through the optical path changing means and the objective lens and been reflected from the disk;

wherein the at least two light-receiving regions includes four light-receiving regions in a 2×2 matrix and are separated from adjacent ones of the light-receiving regions by a predetermined distance, such that a center region of the light incident on the photodetector between the light-receiving regions is not received by the light-receiving regions, and wherein the distance between the adjacent light-receiving regions is in an approximate range of 23 to 35 μm.

4. The optical pickup as claimed in claim 3, wherein the objective lens comprises a central region, an intermediate region and a peripheral region in order from an optical axis thereof, wherein the intermediate region has a light control pattern to block the light passing therethrough.

5. The optical pickup as claimed in claim 3, wherein the optical path changing means is a flat type beam splitter to introduce astigmatism to and pass the light emitted from the light source.

6. An optical pickup to access a disk having a recording surface, comprising:

a light source to generate light;

an objective lens to converge the light from the light source to form a light spot ont he recording surface of the disk;

a photodetector; and a light path changing unit to separate the light from the light source incident on said objective lens from the light reflected form the disk and passed back through the objective lens, and to direct the reflected light to said photodetector;

wherein said photodetector has at least two light-receiving regions such that a center region of the light incident on the photodetector between the light receiving regions is not received by the light-receiving regions, wherein a minimum distance between adjacent ones of the light-receiving regions is in an approximate range of 10 to 35 μm.

7. The optical pickup as claimed in claim 6, wherein the minimum distance is in an approximate range of 23 to 35 μm.

8. The optical pickup as claimed in claim 7, wherein the optical path changing means is a flat type beam splitter to introduce astigmatism to and pass the light emitted from the light source.

9. The optical pickup as claimed in claim 7, wherein:

said light source generates the light having a wavelength of approximately 420 nm; and said objective lens has a numerical aperture of approximately 0.6.

10. The optical pickup as claimed in claim 9, wherein the objective lens comprises a central region, an intermediate region and a peripheral region in order from an optical axis thereof, wherein the intermediate region has a light control pattern to block the light passing therethrough.

11. The optical pickup as claimed in claim 6, wherein the at least two light-receiving regions includes four light-receiving regions in a 2×2 matrix.

12. The optical pickup as claimed in claim 11, wherein the minimum distance is in an approximate range of 23 to 35 μm.

13. The optical pickup as claimed in claim 6, wherein:

said light source generates the light having a wavelength of approximately 420 nm; and said objective lens has a numerical aperture of approximately 0.6.

14. The optical pickup as claimed in claim 6, wherein the optical path changing means is a flat type beam splitter to introduce astigmatism to and pass the light emitted from the light source.

15. The optical pickup as claimed in claim 6, wherein the objective lens comprises a central region, an intermediate region and a peripheral region in order from an optical axis thereof, wherein the intermediate region has a light control pattern to block the light passing therethrough.

16. An optical pickup designed to focus light on a digital versatile disk DVD, and compatible with a compact disk (CD), comprising:

a light source to generate light;

an objective lens to converge the light from the light source to form a light spot on the recording surface of the CD;

a photodetector; and a light path changing unit to separate the light from the light source incident on said objective lens from the light reflected from the CD and passed back through the objective lens, and to direct the reflected light to said photodetector;

wherein said photodetector has four light-receiving regions in a 2×2 matrix spaced far enough away from each other to reduce a focus error signal offset of the reflected light.

17. The optical pickup as claimed in claim 16, wherein distances between adjacent ones of the four light-receiving regions is in a range of 23 to 35 $\mu$m.

18. The optical pickup as claimed in claim 17, wherein the objective lens comprises a central region, an intermediate region and a peripheral region in order from an optical axis thereof, wherein the intermediate region has a light control pattern to block the light passing therethrough.

19. The optical pickup as claimed in claim 17, wherein:

said light source generates the light having a wavelength of approximately 420 nm; and said objective lens has a numerical aperture of approximately 0.6.

20. The optical pickup as claimed in claim 16, wherein:

said light source generates the light having a wavelength of approximately 420 nm; and said objective lens has a numerical aperture of approximately 0.6.

\* \* \* \* \*

UNITED STATES PATENT AND TRADEMARK OFFICE
CERTIFICATE OF CORRECTION

PATENT NO. : 6,023,449
DATED : February 8, 2000
INVENTOR(S) : Chong-sam CHUNG

It is certified that error appears in the above-identified patent and that said Letters Patent is hereby corrected as shown below:

Column 6,    line 29,    claim 6, change "ont he" to --on the--;
                 line 35,    claim 6, change "form" to --from--.

Signed and Sealed this

Thirteenth Day of February, 2001

Attest:

NICHOLAS P. GODICI

Attesting Officer    Acting Director of the United States Patent and Trademark Office